United States Patent
Cho et al.

(10) Patent No.: US 7,636,570 B2
(45) Date of Patent: Dec. 22, 2009

(54) METHOD OF PROVIDING A FAST DOWNLINK SERVICE IN A HARD HANDOVER IN A CELLULAR COMMUNICATION SYSTEM

(75) Inventors: Dong-Ho Cho, Seoul (KR); Pil-Yong Hwang, Yongin-si (KR); In-Sun Lee, Seoul (KR); Chi-Hyun Park, Suwon-si (KR); Ae-Ri Lim, Gunsan-si (KR); Ki-Hyun Pyun, Daejeon (KR); Gyung-Ho Hwang, Gimcheon-si (KR); Ki-Ho Lee, Daejon (KR); Tae-Soo Kwon, Pohang-si (KR)

(73) Assignees: Samsung Electronics Co., Ltd. (KR); Korea Advanced Institute of Science and Technology (KAIST) (KR)

( * ) Notice: Subject to any disclaimer, the term of this patent is extended or adjusted under 35 U.S.C. 154(b) by 450 days.

(21) Appl. No.: 10/951,228

(22) Filed: Sep. 27, 2004

(65) Prior Publication Data

US 2005/0075108 A1    Apr. 7, 2005

(30) Foreign Application Priority Data

Oct. 1, 2003    (KR) ............... 10-2003-0068315

(51) Int. Cl.
*H04Q 7/20*    (2006.01)
(52) U.S. Cl. ............... 455/436; 370/330; 370/331
(58) Field of Classification Search ......... 455/436–439; 370/330–331
See application file for complete search history.

(56) References Cited

U.S. PATENT DOCUMENTS

| | | | |
|---|---|---|---|
| 6,216,004 B1* | 4/2001 | Tiedemann et al. | 455/442 |
| 6,230,005 B1* | 5/2001 | Le et al. | 455/414.1 |
| 6,577,874 B1* | 6/2003 | Dailey | 455/521 |
| 6,747,965 B1* | 6/2004 | Nara et al. | 370/335 |
| 6,829,482 B2* | 12/2004 | Rune et al. | 455/442 |
| 6,879,832 B1* | 4/2005 | Palm et al. | 455/445 |
| 6,907,014 B1* | 6/2005 | Kitade | 370/280 |
| 6,914,932 B1* | 7/2005 | Miya et al. | 375/150 |
| 6,937,605 B2* | 8/2005 | Purnadi et al. | 370/401 |
| 6,975,608 B1* | 12/2005 | Park et al. | 370/332 |
| 7,076,248 B2* | 7/2006 | Amirijoo et al. | 455/432.1 |
| 7,254,393 B2* | 8/2007 | Marque-Pucheu | 455/436 |
| 7,277,709 B2* | 10/2007 | Vadgama | 455/453 |
| 2001/0051526 A1* | 12/2001 | Ruutu et al. | 455/456 |
| 2002/0071480 A1* | 6/2002 | Marjelund et al. | 375/141 |
| 2002/0077141 A1* | 6/2002 | Hwang et al. | 455/522 |
| 2002/0142771 A1* | 10/2002 | Saifullah et al. | 455/436 |
| 2003/0083069 A1* | 5/2003 | Vadgama | 455/436 |
| 2003/0119533 A1* | 6/2003 | Sarkkinen et al. | 455/500 |

* cited by examiner

*Primary Examiner*—CongVan Tran
(74) *Attorney, Agent, or Firm*—NSIP Law

(57) ABSTRACT

A method quickly resuming a downlink service in a hard handover in a cellular mobile communication system. To provide the fast downlink service to an MS during a hard handover from an OBS to an NBS, the NBS receives handover user information from the OBS, and generates an MS temporary ID using the handover user information to identify the MS. If user data is generated for the MS before a connection is established for traffic transmission between the MS and the NBS, the NBS transmits the user data to the MS on an HCCH using the MS temporary ID.

18 Claims, 17 Drawing Sheets

MS_TEMP_ID

| BS_ID | MS_LOCAL_ID |
|---|---|

FIG.6A

MS_TEMP_ID

| DIFF_BS_ID | MS_LOCAL_ID |
|---|---|

FIG.6B

METHOD OF PROVIDING A FAST DOWNLINK SERVICE IN A HARD HANDOVER IN A CELLULAR COMMUNICATION SYSTEM

PRIORITY

This application claims priority under 35 U.S.C. § 119 to an application entitled "Method of Providing Fast Downlink Service in Hard Handover in a Cellular Communication System" filed in the Korean Intellectual Property Office on Oct. 1, 2003 and assigned Serial No. 2003-68315, the contents of which are incorporated herein by reference.

BACKGROUND OF THE INVENTION

1. Field of the Invention

The present invention relates generally to a cellular mobile communication system, and in particular, to a method for quickly resuming a downlink service in a hard handover.

2. Description of the Related Art

Typically, a cellular communication system divides its service area into smaller service areas, i.e., cells covered by base stations (BSs). A mobile switching center (MSC) controls these BSs such that mobile stations (MSs) can continue ongoing calls, when moving from one cell to another. The cellular communication system uses FDMA (Frequency Division Multiplexing Access), CDMA (Code Division Multiple Access), etc., to enable a BS to wirelessly communicate with a plurality of MSs.

In a CDMA communication system, radio channels are identified by orthogonal spreading codes in order to share the same frequency and the same time. One of the features of the CDMA communication system is a soft handover for simultaneously connecting an MS in an overlap area between cells to channels of at least two BSs, to guarantee stable communication.

Compared to the CDMA characterized by spreading of data prior to transmission, orthogonal frequency division multiplexing (OFDM), which has recently attracted much interest, inverse-fast-Fourier-transforms (IFFT) data and inserts a guard interval to the IFFT data prior to transmission. As a result, OFDM offers a benefit of transmitting a wideband signal while using relatively simple hardware compared to the CDMA. An OFDM communication system simultaneously delivers modulated symbols at narrowband frequencies called sub-carriers. Because these sub-carriers use very narrow frequency bands, it is considered that they are flat-fading on the whole.

However, the OFDM communication system does not support a soft handover for simultaneously connecting two channels because neighbor cells use different sub-carriers to prevent interference between them. Therefore, an MS is disconnected from a channel of an old cell and connected to a channel of a new cell, although it usually happens too fast for a user to recognize during voice communication. This operation is called a hard handover. Here, the channels use different sub-carriers. The most important thing in performing the hard handover is to prevent a time delay required for the MS to receive a service from the new BS from affecting the service.

In the hard handover, the new BS assigns channels to the MS for transmission/reception of traffic and control information. An ongoing call is interrupted during the channel assignment. To enable both uplink and downlink services for the MS in the hard handover, the MS must access the new BS and get a new local ID, a traffic channel, and a control channel assigned from the new BS. However, a long time delay can be created by the possible collision between the MS and another MS during the access to the BS. During the hard handover, a time delay of tens of milliseconds occurs. In the case of real-time traffic sensitive to delay such as moving pictures, this time delay significantly degrades quality of service.

SUMMARY OF THE INVENTION

Therefore, the present invention has been designed to substantially solve at least the above problems and/or disadvantages and to provide at least the advantages below. Accordingly, an object of the present invention is to provide a method of enabling an MS to receive downlink traffic before accessing a new BS in a hard handover in a cellular communication system.

Another object of the present invention is to provide a method of reducing a service delay for an MS in a hard handover in a cellular communication system.

A further object of the present invention is to provide a method of assigning a downlink traffic channel to an MS that transmits/receives real-time traffic sensitive to delay in a hard handover in a cellular communication system.

The above and other objects are achieved by providing a method for quickly resuming a downlink service in a hard handover in a cellular mobile communication system. To provide a fast downlink service to an MS in a hard handover from an old BS (OBS) to a new BS (NBS), the NBS receives handover user information from the OBS, and generates an MS temporary ID using the handover user information to identify the MS. If user data is generated for the MS before a connection is established for traffic transmission between the MS and the NBS, the NBS transmits the user data to the MS on a handover common channel (HCCH) using the MS temporary ID.

To receive a fast downlink service in a hard handover from an OBS to an NBS in a cellular communication system, an MS receives the ID of the NBS from the OBS, generates an MS temporary ID using the NBS ID and the ID of the MS, and receives user data on an HCCH using the MS temporary ID until a connection is established for traffic transmission between the MS and the NBS.

BRIEF DESCRIPTION OF THE DRAWINGS

The above and other objects, features, and advantages of the present invention will become more apparent from the following detailed description when taken in conjunction with the accompanying drawings in which:

FIGS. 6A and 6B illustrate embodiments of an MS temporary ID according to the present invention;

DETAILED DESCRIPTION OF THE PREFERRED EMBODIMENTS

Several preferred embodiments of the present invention will be described in detail herein below with reference to the accompanying drawings. In the following description, well-known functions or constructions are not described in detail since they would obscure the invention in unnecessary detail.

Figure 1:
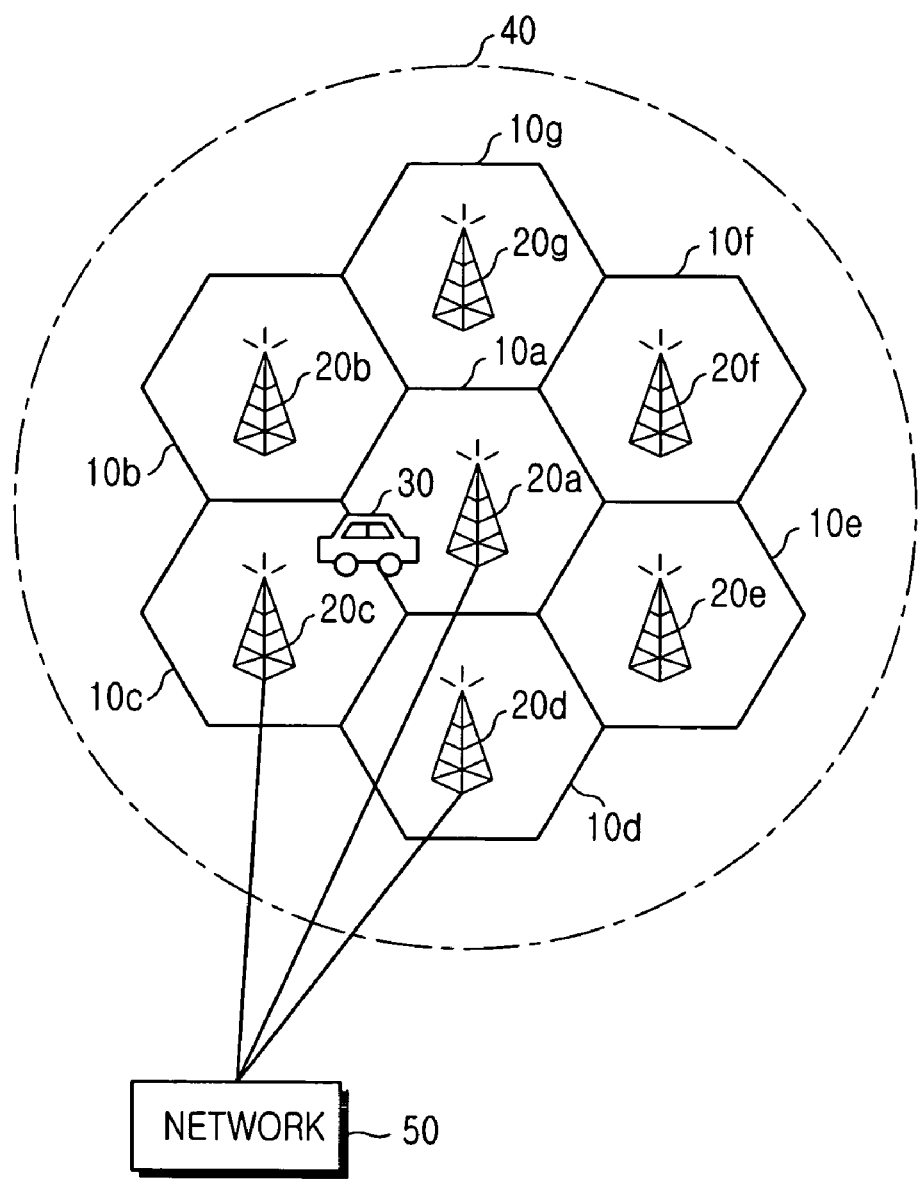
FIG. 1 illustrates the configuration of a cellular mobile communication network to which the present invention is applied.

FIG. 1 illustrates the configuration of a cellular mobile communication network to which the present invention is applied. Referring to FIG. 1, a service area 40 of a mobile communication network is divided into a plurality of cells 10a to 10g, which neighbor one another. While the cells 10a to 10g illustrated in FIG. 1 are hexagonal, they are actually irregular in shape depending on signal strength and arrangement of obstacles and overlap with one another. The cells 10a to 10g are covered by BSs 20a to 20g, respectively, that provide a communication service to an MS 30 on a traffic channel and a control channel. The BSs 20a to 20g are connected to a network 50 via routers or gateways.

When the MS 30 communicates with the BSs 20a to 20g in OFDM, a hard handover occurs each time the MN 30 moves across a cell boundary.

Figure 2:
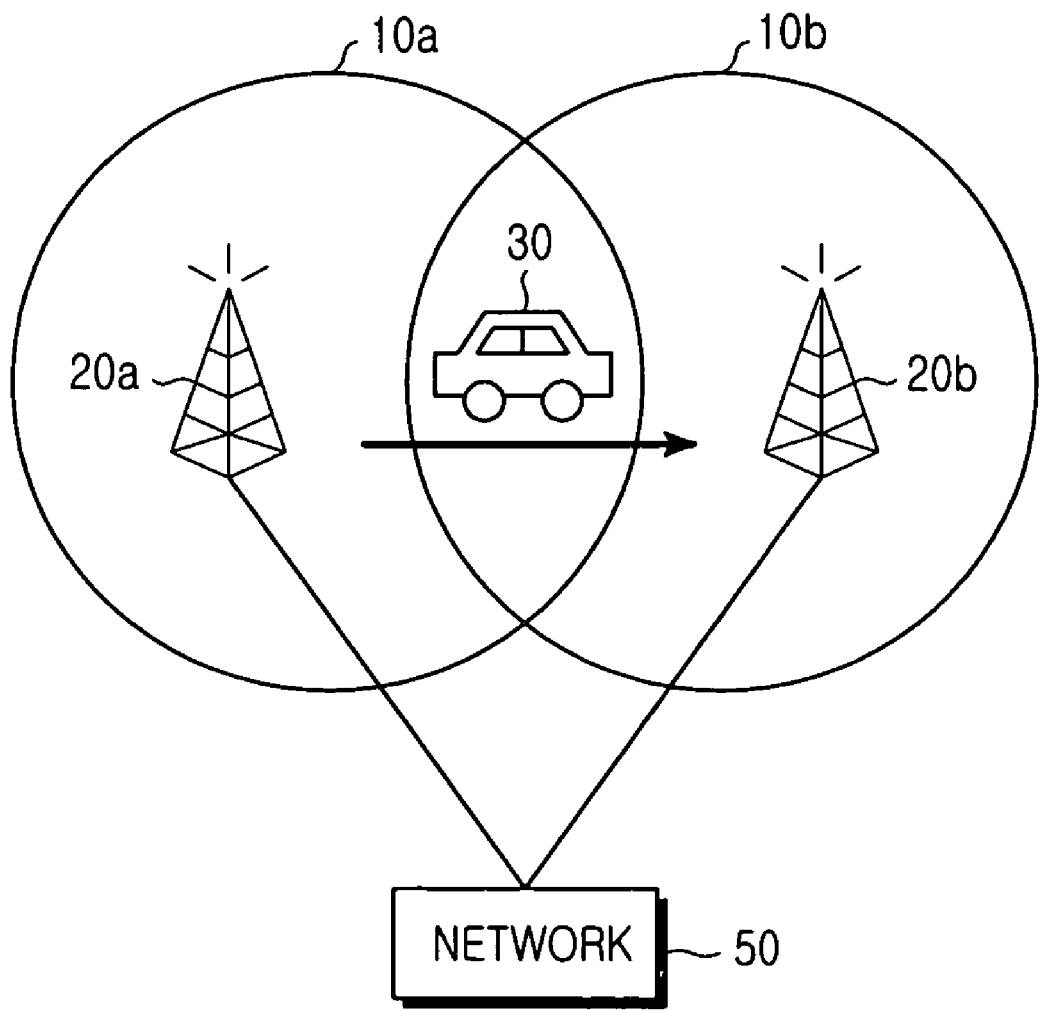
FIG. 2 illustrates movement of an MS between cells in the cellular mobile communication network to which the present invention is applied.

FIG. 2 illustrates movement of the MS between cells in the cellular mobile communication network to which the present invention is applied. Referring to FIG. 2, the MS 30, which is inside a car, for example, is in an overlap area between the first cell 10a of the first BS 20a and the second cell 10b of the second BS 20b, moving toward the second cell 10b. The first BS 20a and the second BS 20b may be connected to the same network or different networks. In FIG. 2, the BSs 20a and 20b are connected to the same network 50. Here, the first BS 20a is called a source BS or an old BS (OBS), and the second BS 20b is called a target BS or a new BS (NBS).

Figure 3:
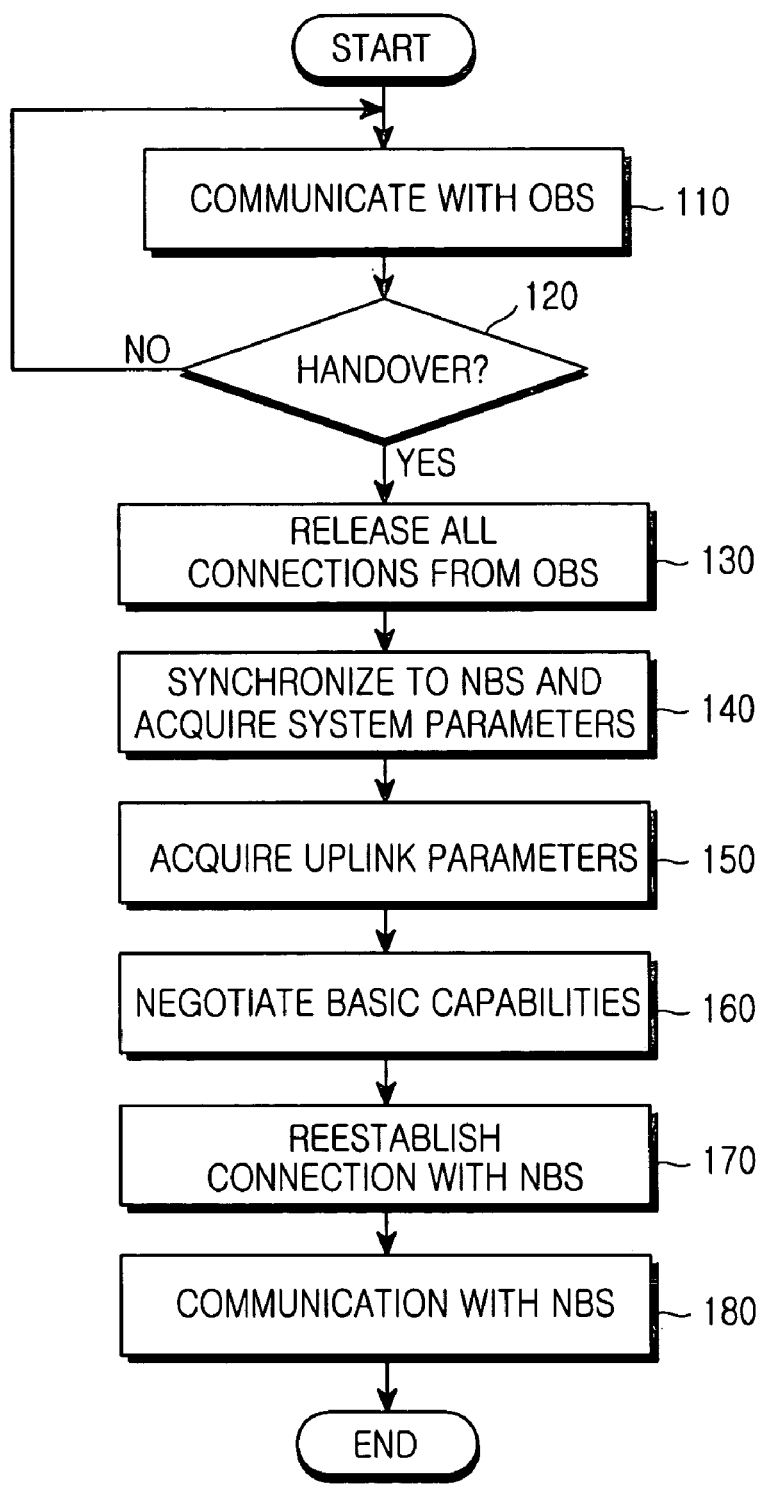
FIG. 3 is a flowchart illustrating a hard handover procedure in an MS that moves from an old BS to a new BS.

FIG. 3 is a flowchart illustrating a hard handover procedure in an MS that moves from an OBS to an NBS. Referring to FIG. 3, the MS establishes a radio channel with the OBS and is communicating with the OBS in step 110. The MS measures the strengths of pilot signals from detectable neighbor BSs periodically or when the strength of a pilot signal from the OBS in communication with the MS is equal to or less than a predetermined handover threshold.

In step 120, the MS detects another BS considered to transmit a pilot signal strong enough, that is, an NBS and determines whether to perform a handover. Alternatively, the MS reports the pilot strength measurements to the OBS and determines whether to perform the handover according to an indication from the OBS. The MS then releases the existing connection from the OBS in step 130 and acquires system parameters by synchronizing to a downlink from the NBS in step 140. In step 150, the MS synchronizes to an uplink to the NBS and acquired uplink parameters.

In an OFDM communication system, the MS acquires downlink synchronization by receiving a repeated preamble or a cyclic prefix (CP) from the NBS. The preamble is a symbol attached at the start of an OFDM frame, for OFDM frame synchronization, and the CP is information attached before an OFDM symbol, for OFDM symbol synchronization.

Figure 4:
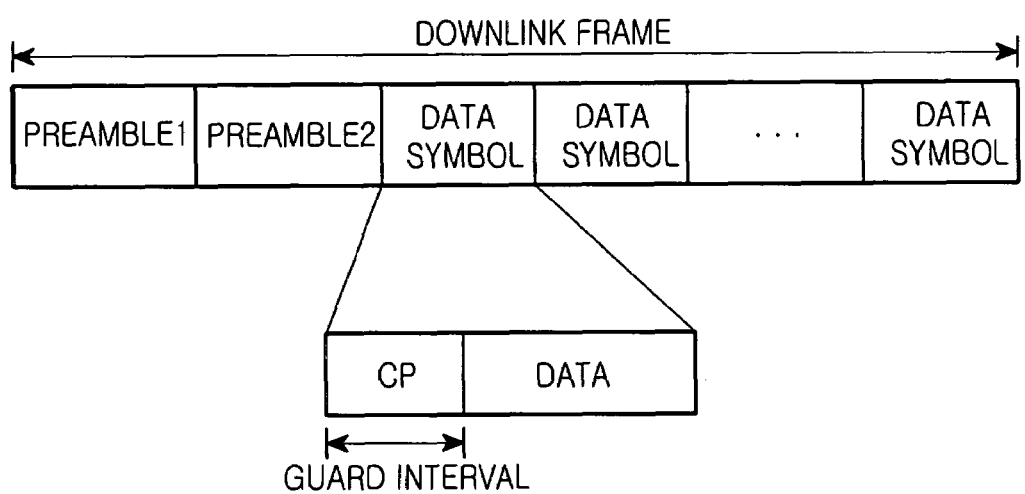
FIG. 4 illustrates the structure of a downlink OFDM frame in the time domain, for frame and symbol synchronization.

FIG. 4 illustrates a downlink OFDM frame in a time domain, for frame and symbol synchronization. Referring to FIG. 4, the downlink OFDM frame includes a first preamble (preamble 1) for frame synchronization and a second preamble (preamble 2) for identifying a BS. Each of data symbols following the preamble sequence includes a CP in a guard interval and data.

As the MS moves from an OBS to an NBS by a handover, it monitors a downlink signal from the NBS and acquires downlink frame and symbol synchronizations. This operation can be carried out while detecting signals from neighbor BSs before the MS initiates the handover.

In the OFDM communication system, the MS acquires the uplink synchronization by receiving an ACK (Acknowledgement) for a transmitted access packet from the BS. Then, the MS receives uplink transmission resources from the BS.

Figure 5:
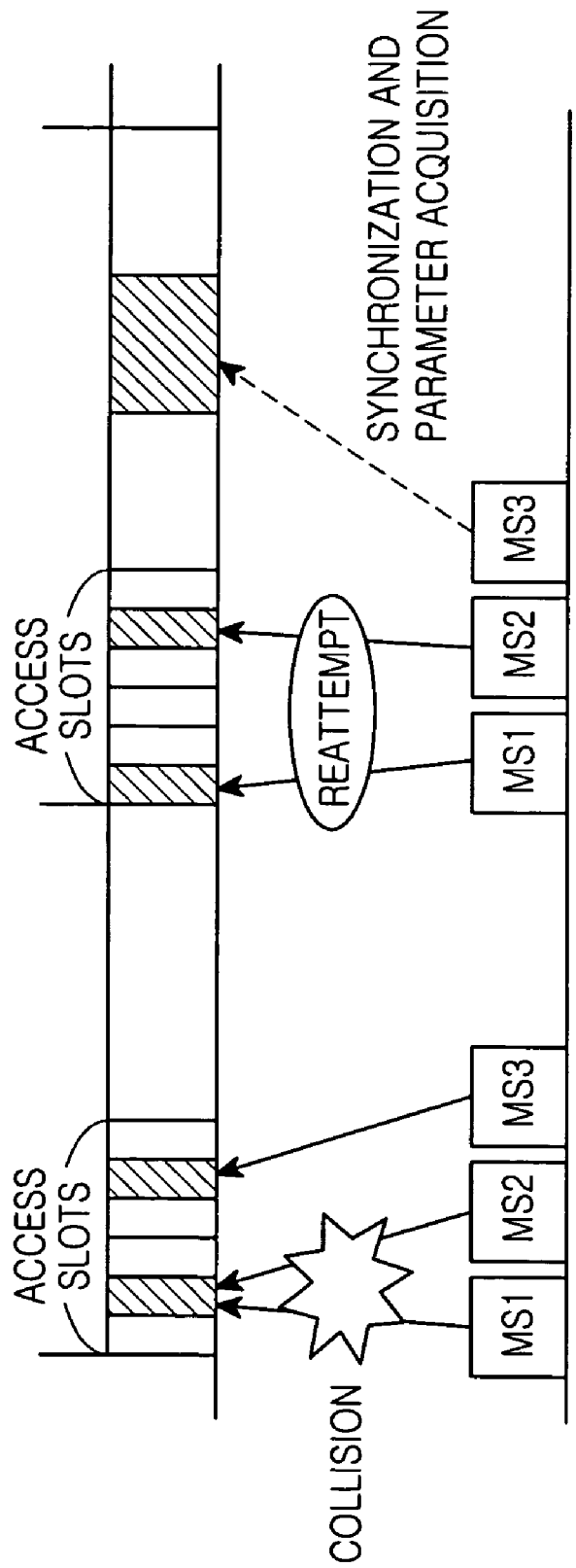
FIG. 5 illustrates uplink synchronization of MSs.

FIG. 5 illustrates uplink synchronization of MSs. Referring to FIG. 5, the MSs (MS1-MS3) monitor uplink access slots according to downlink broadcast information and attempt a random access in their corresponding slots. A random access is the process of transmitting an access packet in a slot randomly selected among predetermined access slots, which may create collision between MSs. This collision causes a time delay until an MS receives an uplink service.

In the case illustrated in FIG. 5, MS1 and MS2 use the same access slot, thus colliding against each other. However, MS3 succeeds in transmitting an access packet without collision and receives an ACK from a BS. Therefore, MS3 acquires uplink synchronization and receives system parameters from the BS, while MS1 and MS2 must attempt the random access in the next access period.

If an MS accesses an NBS in steps 140 and 150 illustrated in FIG. 3, it negotiates basic capabilities with the NBS and is assigned to radio resources by the NBS in step 160. The MS then re-establishes a connection with the NBS in step 170 and communicates with the NBS in step 180.

In the hard handover procedure described above, the MS must access the NBS to initiate a communication with the NBS. The MS requires time to acquire downlink and uplink system parameters and synchronization information and be assigned to radio resources in accessing the NBS. Without the information, the MS cannot transmit uplink data to the NBS.

The NBS receives handover user information from the OBS in the handover. Accordingly, based on this idea, the present invention proposes that the NBS transmits downlink data to the MS on a handover common channel (HCCH) before the MS accesses the NBS.

A temporary ID is needed to identify the MS in the NBS to provide a downlink service to the handover MS before the MS receives a new local ID and a control channel from the NBS.

Therefore, the NBS assigns the HCCH with a temporary ID, before the MS attempts to access the NBS. Like a typical local ID, the temporary ID is inserted at the start of packet data directed from the NBS to the MS. This temporary ID is valid until the MS attempts to access the NBS and receives downlink and uplink resources from the NBS.

As described above, the temporary ID (MS_TEMP_ID) available to the MS in a hard handover is used until the MS succeeds in accessing the NBS and receives a local ID from the NBS. The temporary ID is preferably created from the IDs of the OBS and NBS (BS_ID) and a local ID (MS_LOCAL_ID) assigned by the OBS. This temporary ID is specific to the MS in the NBS and can be used even if no information is transmitted/received between the NBS and the MS. That is, the same temporary ID is used between the MS and the NBS so that the NBS can identify the handover MS just using the handover user information received from the OBS.

FIGS. 6A and 6B illustrate embodiments of MS_TEMP_ID according to the present invention. Referring to FIG. 6A, MS_TEMP_ID is formed by connecting the ID of an OBS (BS_ID) to an MS local ID (MS_LOCAL_ID) assigned to an MS by the OBS. Referring to FIG. 6B, MS_TEMP_ID is formed by connecting the difference (DIFF_BS_ID) between the ID of the OBS (OBS_ID) and the ID of the NBS (NBS_ID) to the MS local ID (MS_LOCAL_ID) assigned to the MS by the OBS. In this case, the MS receives NBS_ID on a broadcast channel (BCCH) from the OBS.

Figure 7:
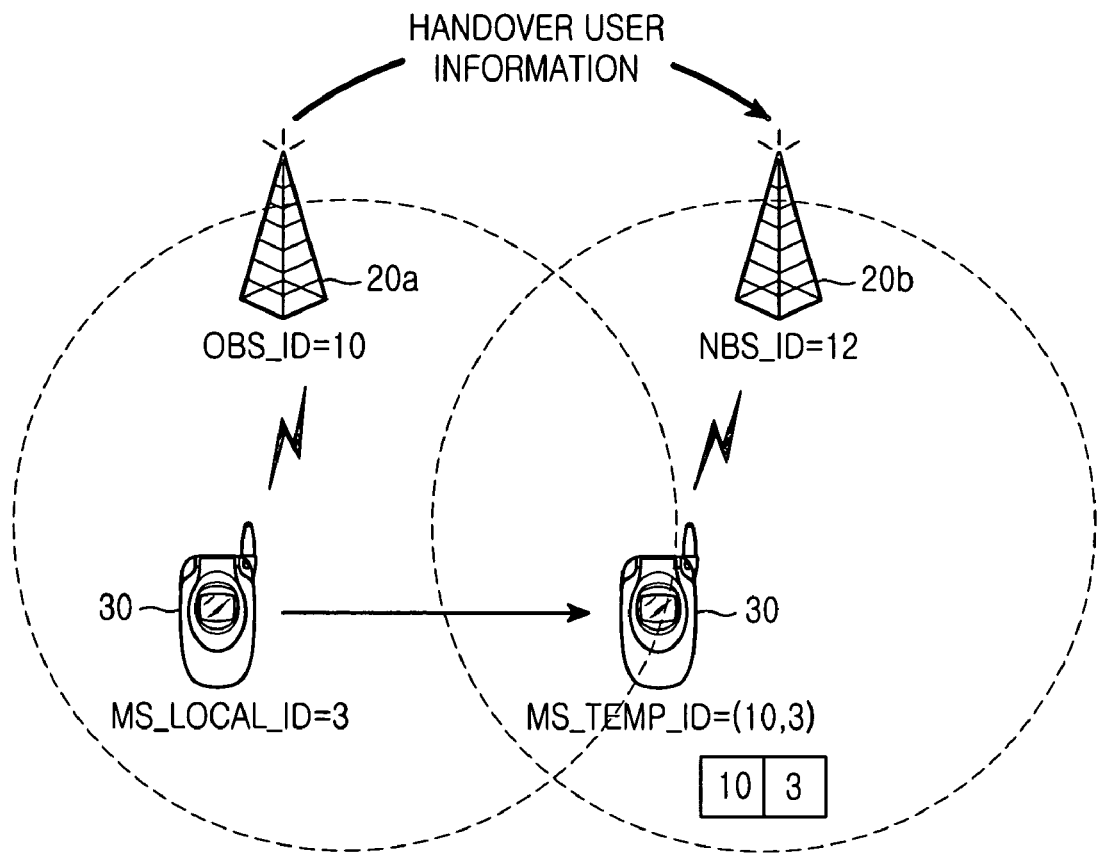
FIG. 7 illustrates an embodiment of an operation for assigning a temporary ID to an MS in a hard handover according to the present invention.

FIG. 7 illustrates an embodiment of an operation for assigning a temporary ID to an MS in a hard handover according to the present invention. Referring to FIG. 7, an MS 30 implements a hard handover from an OBS 20a to an NBS 20b. When the handover occurs, the OBS 20a transmits handover user information associated with the MS 30 to the NBS 20b. The handover user information contains OBS_ID and MS_LOCAL_ID. It is assumed here that OBS_ID is 10 and MS_LOCAL_ID is 3.

The NBS 20b then assigns (10, 3) as MS_TEMP_ID to the MS 30 and uses the temporary ID in transmitting downlink data to the MS 30. The MS 30 also creates (10, 3) as an MS_TEMP_ID and uses it in receiving the downlink data from the NBS 20b.

Figure 8:
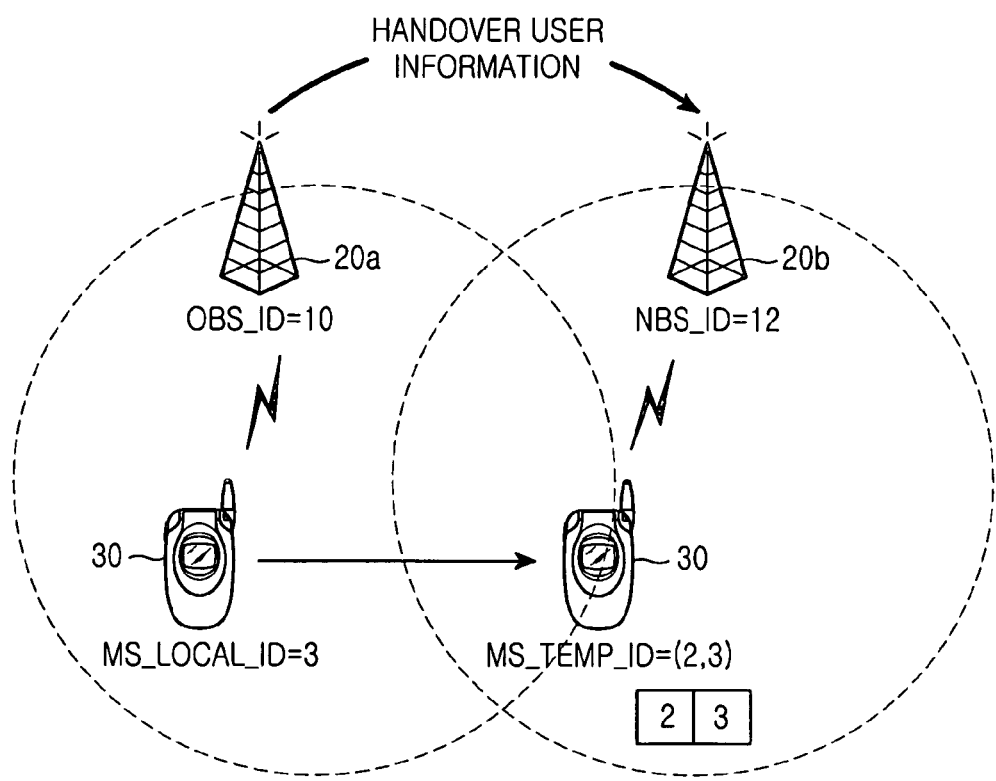
FIG. 8 illustrates another embodiment of an operation for assigning a temporary ID to an MS in a hard handover according to the present invention.

FIG. 8 illustrates another embodiment of an operation for assigning a temporary ID to an MS in a hard handover according to the present invention. In FIG. 8, OBS_ID is 10, MS_LOCAL_ID is 3, and NBS_ID is 12. The difference between OBS_ID and NBS_ID is 2 (2=12−10). Therefore, the NBS 20b assigns (2, 3) as MS_TEMP_ID to the MS 30, for use in downlink data transmission to the MS 30. The MS 30 acquires NBS_ID from the NBS 20b on a broadcast common channel (BCCH) after the handover, and also creates (2, 3) as MS_TEMP_ID for use in receiving the downlink data.

The NBS transmits downlink data to the MS on a logical channel, HCCH with MS_TEMP_ID. The HCCH services the MSs that have not succeeded in accessing yet. When the MS attempts to access the NBS and receives downlink and uplink resources from the NBS, the HCCH is not used for the MS.

In the OFDM communication system, the HCCH is assigned in a predetermined position (in frequency and in time) of an OFDM frame. The NBS sets a bit (hereinafter, referred to as an HCCH indication bit) indicating that HCCH data is included in a portion of the OFDM frame spared for a BCCH. When the HCCH data is not transmitted, the HCCH indication bit is set such that the portion that is otherwise assigned to the HCCH, is used for a traffic channel.

Figure 9:
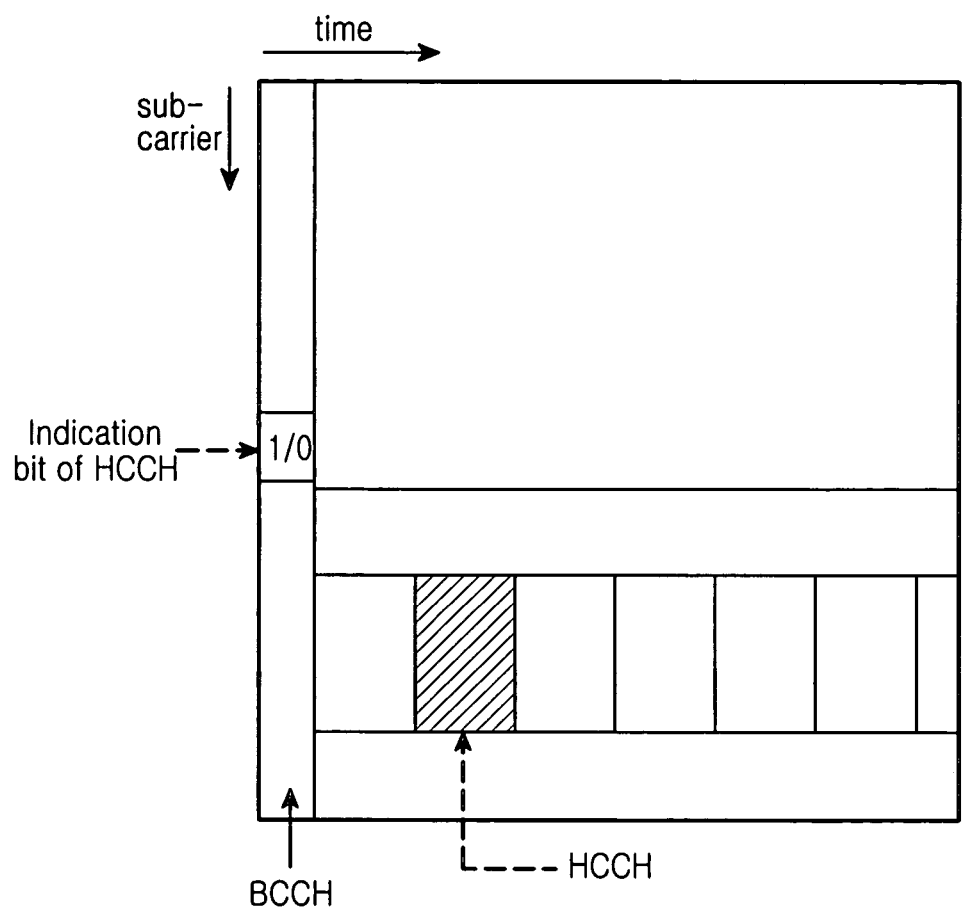
FIG. 9 illustrates the structure of an OFDM frame including a handover common channel (HCCH) according to an embodiment of the present invention.

FIG. 9 illustrates an OFDM frame including an HCCH according to an embodiment of the present invention. A vertical axis represents sub-carrier resources and a horizontal axis represents time slots in the OFDM frame.

Referring to FIG. 9, the HCCH indication bit is set to indicate whether an HCCH is used in a predetermined position of a BCCH in the OFDM frame. When the HCCH indication bit is set to 1, this implies that HCCH data is included in a predetermined position of a following data block. The positions of the HCCH indication bit and the HCCH are preset between the BS and the MS.

Figure 10A:
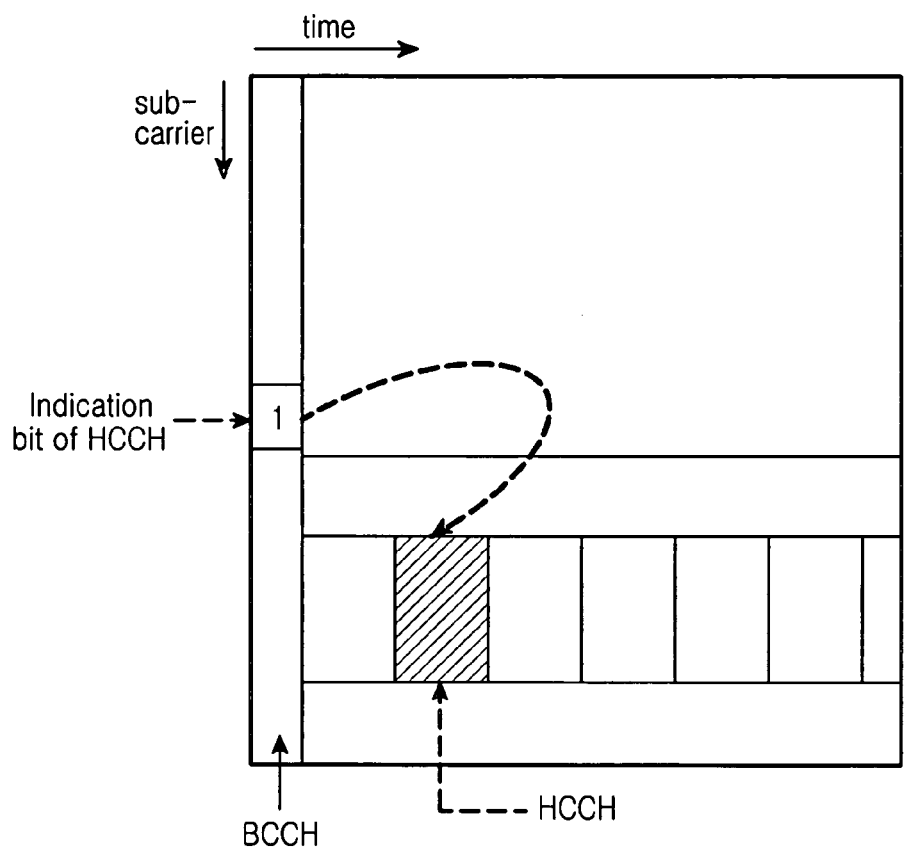
FIGS. 10A and 10B illustrate an example of HCCH setting according to an embodiment of the present invention.
Figure 10B:
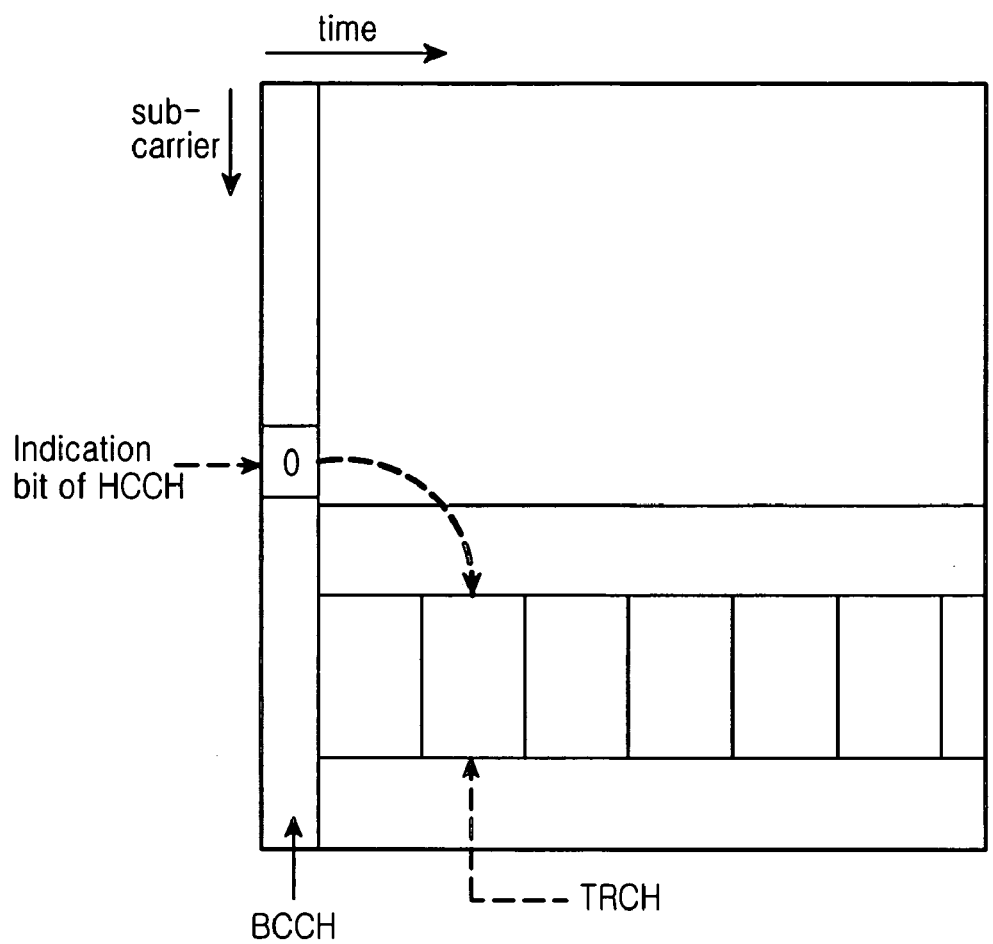

FIGS. 10A and 10B illustrate an example of setting the HCCH according to the embodiment of the present invention. In FIG. 10A, the HCCH indication bit is set to 1. Accordingly, the HCCH data is included in the predetermined position of the OFDM frame. When the HCCH indication bit is set to 0, as illustrated in FIG. 10B, user data for a traffic channel (TRCH) is filled in the position of the HCCH data. This data is destined for a MS that is not in a handover situation.

If the position of the HCCH is preset between the MS and the NBS, the NBS has only to set the HCCH indication bit. Otherwise, the NBS must include information indicating the position of the HCCH in the BCCH of the OFDM frame. This position indicating information will be referred to as HCCH resource information in that it indicates the amount of data transmittable on the HCCH. That is, the NBS can determine the amount of data transmittable on the HCCH based on the HCCH resource information. Both the HCCH indication bit and the HCCH resource information will be referred to as HCCH assignment information.

Figure 11:
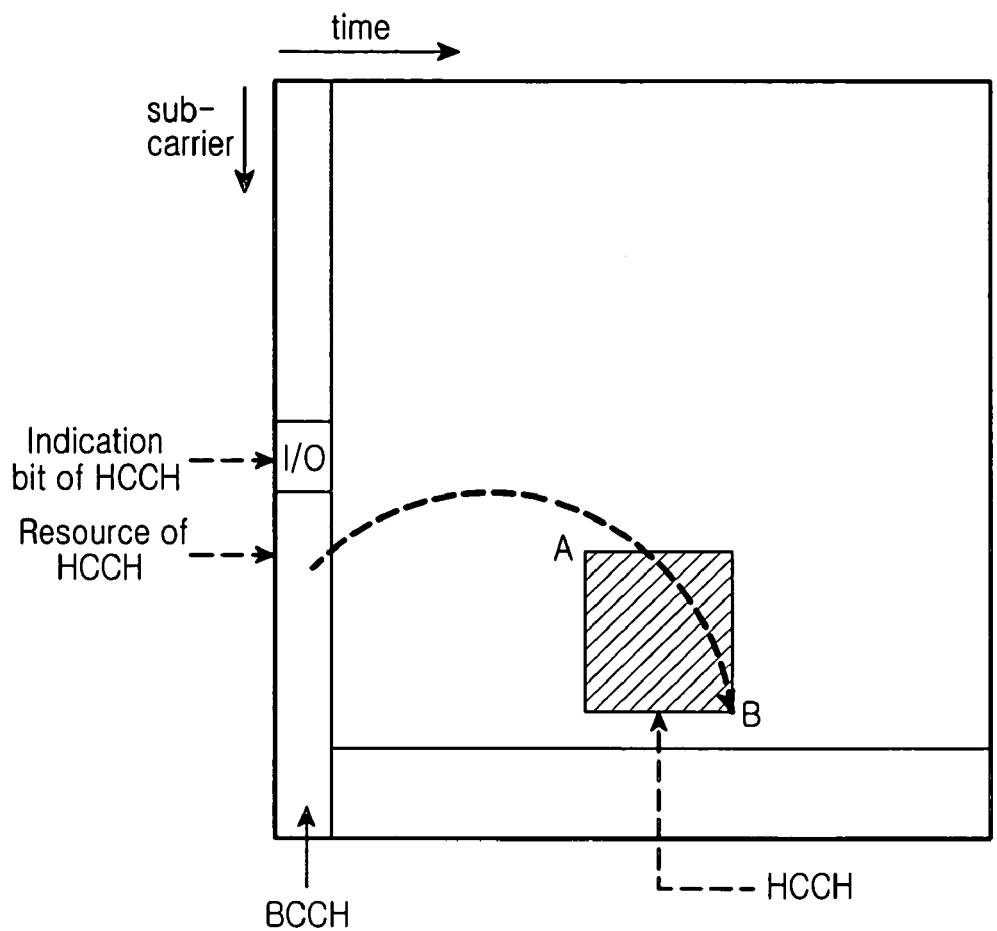
FIG. 11 illustrates the structure of an OFDM frame including an HCCH according to an embodiment of the present invention.

FIG. 11 illustrates an OFDM frame containing the HCCH according to another embodiment of the present invention. A vertical axis represents sub-carrier resources and a horizontal axis represents time slots in the OFDM frame.

Referring to FIG. 11, the HCCH indication bit is set to indicate whether the HCCH is used in a predetermined position of the BCCH of the OFDM frame. When the HCCH indication bit is 1, it indicates that the HCCH data is included in a following data block. The HCCH resource information following the HCCH indication bit indicates a position of the OFDM frame in which the HCCH data is located.

As illustrated in FIG. 11, the position of the HCCH data is marked with a square defined by sub-carriers and time slots. If sub-carriers assigned to the HCCH are known, the HCCH resource information is set to indicate the time slots of the HCCH. For example, the sub-carriers of the HCCH are determined by NBS_ID. This example is illustrated in FIG. 12.

Figure 12:
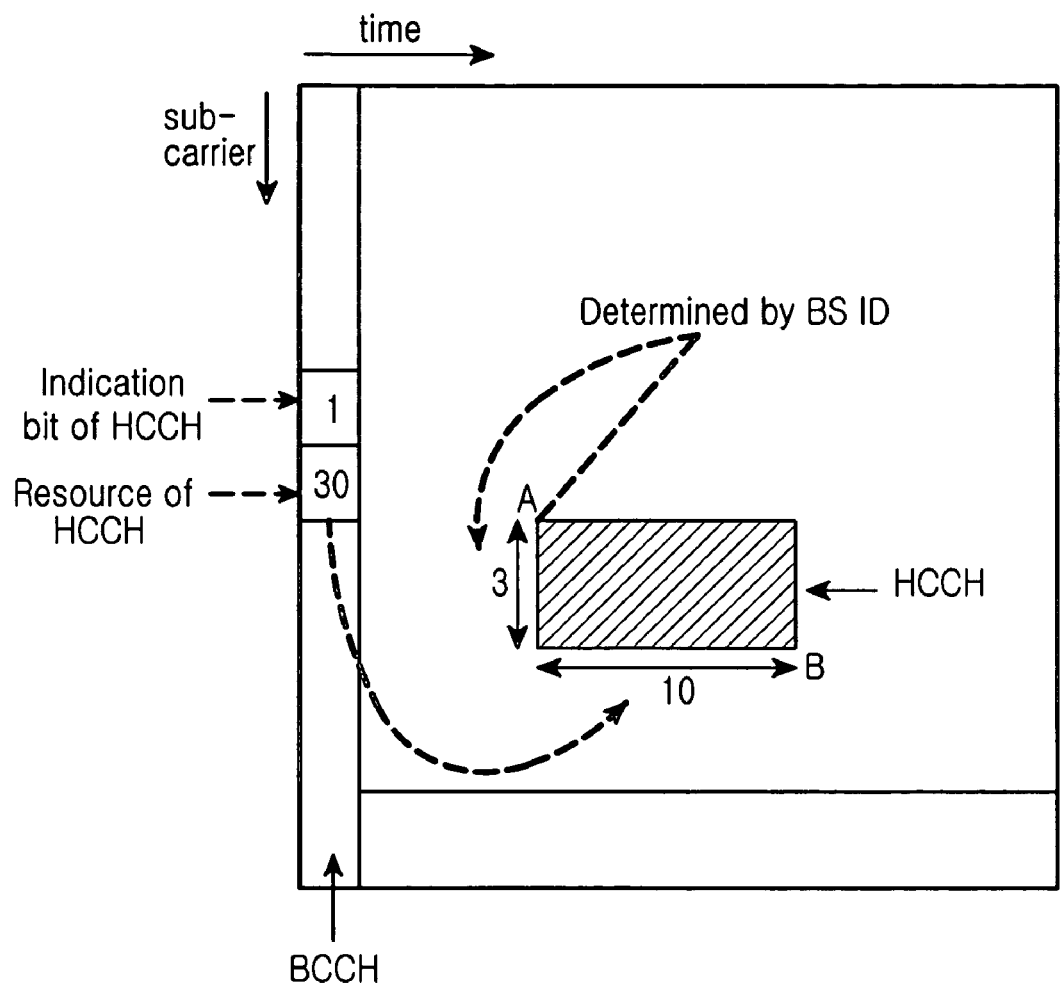
FIG. 12 illustrates an example of how to use the HCCH illustrates the structure of an OFDM frame including an HCCH according to an embodiment of the present invention.

Referring to FIG. 12, the HCCH indication bit is 1 and the sub-carriers of the HCCH are determined according to NBS_ID. And the time slots of the HCCH are determined according to the HCCH resource information. For example, if three sub-carriers are available to the HCCH and NBS_ID is 12, the $12^{th}$, $13^{th}$, and $14^{th}$ sub-carriers are assigned to the HCCH. In the illustrated case, 10 time slots are assigned to the HCCH according to the HCCH resource information. Thus, the HCCH delivers a total of 30 OFDM symbols.

It can be further contemplated as an embodiment of the present invention that assuming that a vertex A of an HCCH block is an HCCH start point and another vertex B of the block is an HCCH end point, the position of the HCCH is represented by indicating the positions of the HCCH start and end points. Then, the HCCH start point is determined by NBS_ID and the HCCH end point is determined by the HCCH resource information.

A description will be made below of an operation for fast providing a downlink service in a hard handover according to an embodiment of the present invention. This operation is considered in two ways depending on whether an MS or a network determines the handover.

Figure 13:
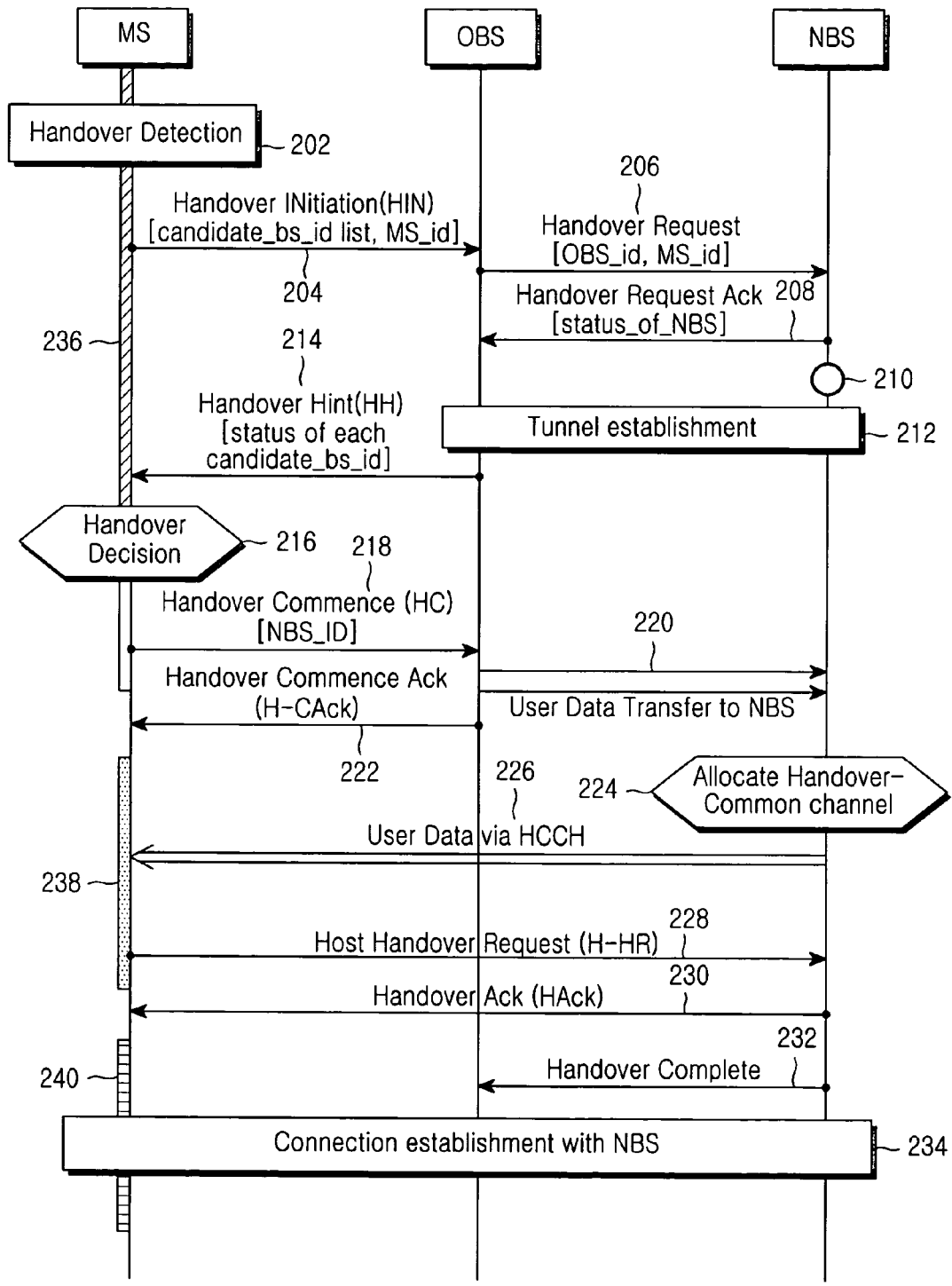
FIG. 13 is a diagram illustrating a signal flow for a downlink service operation when an MS decides a handover according to an embodiment of the present invention.

FIG. 13 is a diagram illustrating a signal flow for a downlink service operation when an MS determines to handover according to an embodiment of the present invention. Reference numeral 236 denotes a service period in which an OBS services an MS, reference numeral 238 denotes a service period in which an NBS services the MS on the HCCH, and reference numeral 240 denotes a service period in which the NBS services the MS on a TRCH. As illustrated in FIG. 13, the service period 238 compensates for a delay between the service periods 236 and 240. The service period 238 will be referred to as a fast forward link service period.

Referring to FIG. 13, when the strength of a pilot signal from the OBS currently serving the MS is equal to or less than a predetermined level, the MS measures the strengths of pilot signals from neighbor BSs and detects BSs (candidate BSs) having pilot strengths equal to or greater than a predetermined threshold in step 202. In step 204, the MS transmits to the OBS a Handover Initiation (HIN) message containing a candidate BS ID list (Candidate_BS_ID List) listing the IDs of the candidate BSs (OBS_ID and NBS_ID, herein), and the ID of the MS (MS_ID). MS_ID is identical to MS_LOCAL_ID.

In step 206, the OBS transmits to the NBS a Handover Request message including OBS_ID and MS_ID. In response to the Handover Request message, the NBS transmits to the OBS a Handover Request Ack message including status information (status_of_NBS) for indicating whether the NBS can accommodate the new MS in step 208, and creates MS_TEMP_ID using MS_ID and OBS_ID in step 210. The contents of step 210 are omitted for simplicity of drawing due to lack of a margin of drawing, and thus the step 210 is simply drawn as just a circle.

In step 212, a tunnel is established as a security path between the OBS and the NBS. The tunnel is used for the OBS to deliver user data destined for the MS received from a network to the NBS.

The OBS then transmits to the MS a Handover Hint (HH) message including status information of the candidate BSs in step 214. The MS selects the NBS for the handover according to the statuses of the candidate BSs in step 216 and transmits to the OBS a Handover Commence (HC) message requesting a handover to the NBS in step 218. The HC message includes NBS_ID.

The OBS transmits to the NBS user data for the MS received from the network in step 220 and transmits to the MS a Handover Commence Ack (H-CAck) message in step 222. Upon receiving the user data from the OBS, the NBS allocates HCCH to the MS, recognizing the commencement of the handover. The NBS broadcasts HCCH assignment information for the MS and then starts to transmit the user data to the MS on the HCCH with MS_TEMP_ID generated in step 210, in step 224.

The MS discontinues data reception from the OBS after transmitting the HC message. Upon receiving the H-CAck message from the OBS, the MS determines whether there is data directed from the NBS to the MS on the HCCH. If there is, the MS receives the data.

The MS transmits to the NBS a Host Handover Request (H-HR) message on an uplink control channel, i.e., an access channel, in step 228. The NBS transmits a Handover Ack (HAck) message to the MS in step 230 and transmits a Handover Complete message to the OBS in step 232. The MS acquires uplink parameters and uplink synchronization from the NBS by the HAck message. In step 234, a connection is established between the MS and the NBS and the MS receives a service on a TRCH from the NBS.

Figure 14:
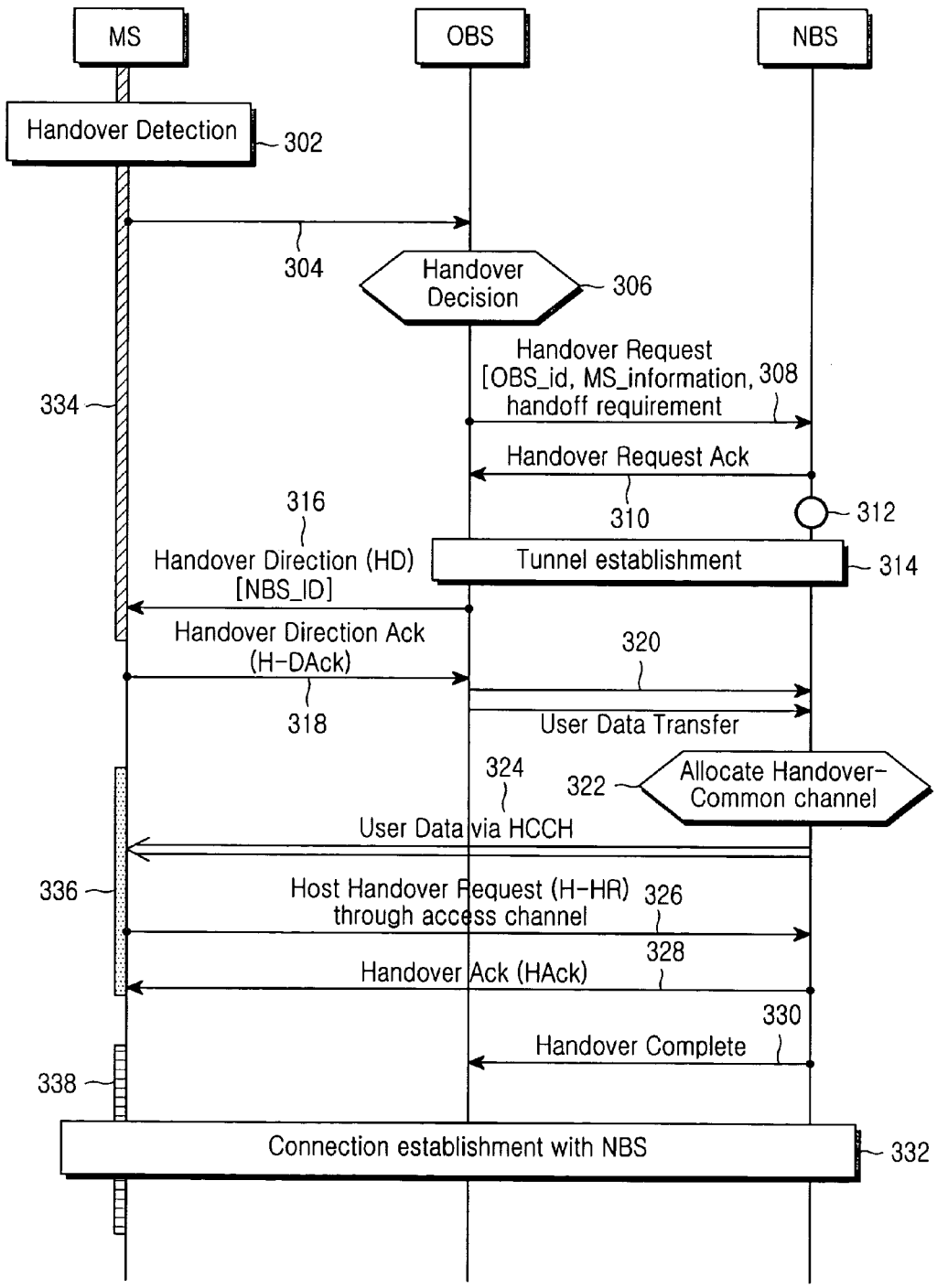
FIG. 14 is a diagram illustrating a signal flow for a downlink service operation when a network decides a handover according to an embodiment of the present invention.

FIG. 14 is a diagram illustrating a signal flow for a downlink service operation when a network determines to handover according to an embodiment of the present invention. Reference numeral 334 denotes a service period in which the OBS services the MS, reference numeral 336 denotes a service period in which the NBS services the MS on the HCCH, and reference numeral 338 denotes a service period in which the NBS services the MS on the TRCH. As illustrated in FIG. 14, the service period 336 compensates for a delay between the service periods 334 and 338. The service period 336 is a fast forward link service period.

Referring to FIG. 14, when the strength of a pilot signal from the OBS currently serving the MS is equal to or less than a predetermined level, the MS measures the strengths of pilot signals from neighbor BSs and detects candidate BSs having pilot strengths equal to or greater than a predetermined threshold in step 302. In step 304, the MS transmits to the OBS a Pilot Reporting message containing Candidate_BS_ID List listing the IDs of the candidate BSs (OBS_ID and NBS_ID, herein), and MS_ID.

In step 306, the OBS selects an NBS to which the MS is to be handed-over by communicating with a network device (not shown) that controls the handover of the MS. The OBS then transmits to the NBS a Handover Request message containing OBS_ID and information about the MS including the MS_ID in step 308. In response to the Handover Request message, the NBS transmits to the OBS a Handover Request Ack message in step 310 and creates an MS_TEMP_ID using MS_ID and OBS_ID in step 312.

In step 314, a tunnel is established as a security path between the OBS and the NBS. The tunnel is used for the OBS to deliver user data destined for the MS received from the network to the NBS.

The OBS then transmits to the MS a Handover Direction (HD) message containing NBS_ID in step 316. The MS transmits a handover Direction Ack (H-DAck) message to the OBS in step 318. Upon receiving the H-DAck message, the OBS starts to transmit to the NBS the user data for the MS received from the network in step 320.

Upon receipt of the user data from the OBS, the NBS allocates HCCH to the MS, recognizing the commencement of the handover. The NBS broadcasts the HCCH assignment information for the MS and then starts to transmit the user data to the MS on the HCCH with MS_TEMP_ID generated in step 310, in step 322.

Upon receiving the HD message, the MS discontinues data reception from the OBS and after transmitting the H-DAck message, determines whether there is data directed from the NBS to the MS on the HCCH. If there is, the MS receives the data.

The MS transmits to the NBS an H-HR message on an uplink control channel, an access channel in step 326. The NBS transmits a HAck message to the MS in step 328 and transmits a Handover Complete message to the OBS in step 330. The MS acquires uplink parameters and uplink synchronization from the NBS by the HAck message. In step 332, a connection is established between the MS and the NBS and the MS receives a service on the TRCH from the NBS.

The operations of the NBS and the MS regarding the fast downlink service in a hard handover according to embodiments of the present invention will be described in more detail herein below.

Figure 15:
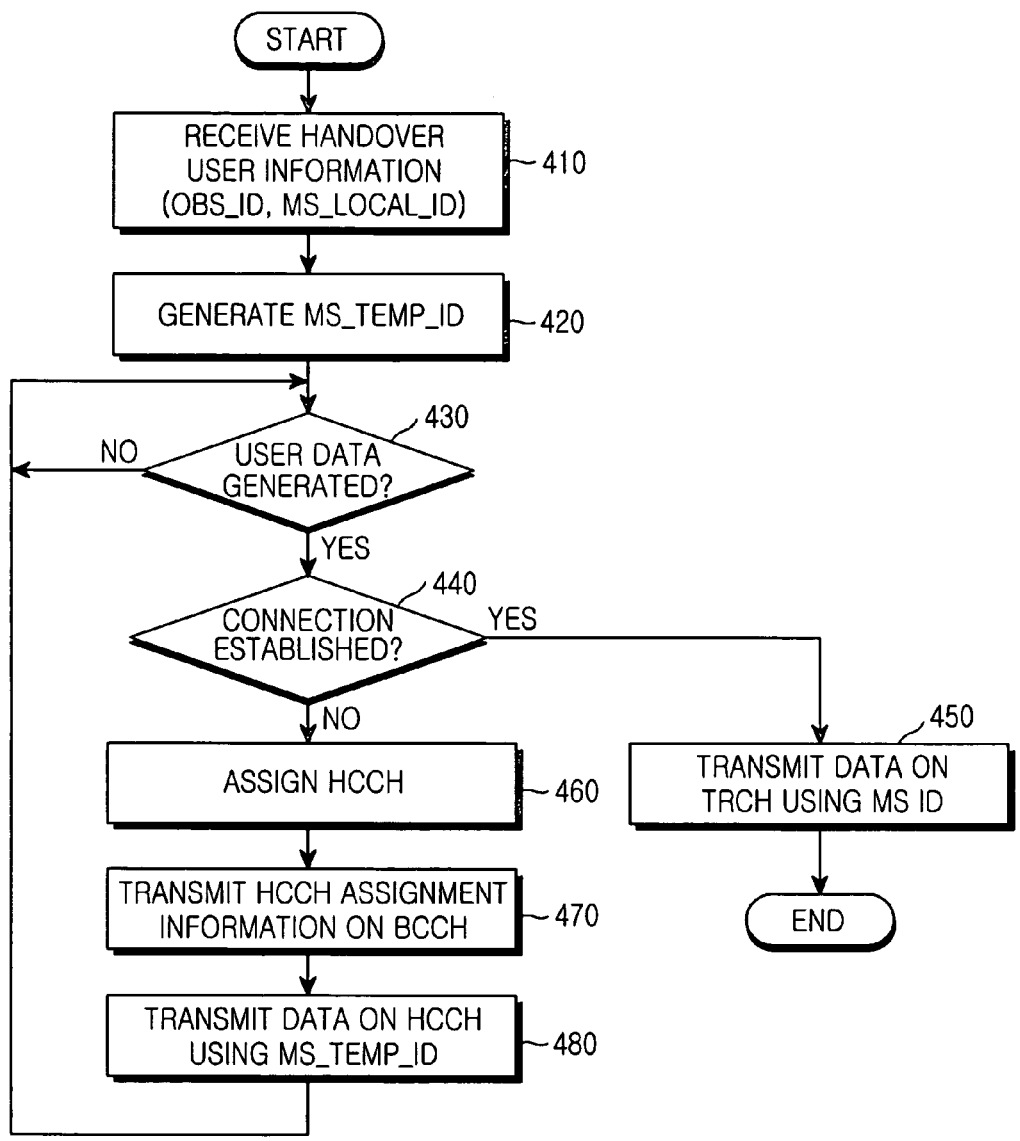
FIG. 15 is a flowchart illustrating an operation in a new BS for performing a hard handover according to an embodiment of the present invention.

FIG. 15 is a flowchart illustrating an operation in the NBS for performing a hard handover according to an embodiment of the present invention. Referring to FIG. 15, the NBS receives handover user information including OBS_ID and MS_LOCAL_ID from the OBS by the Handover Request message in step 410 and generates MS_TEMP_ID using OBS_ID and MS_LOCAL_ID in step 420.

Upon receiving user data destined for the handover MS directly from the network or from the OBS in step 430, the NBS determines whether a connection with the MS is established in step 440. If the connection has been established, the NBS transmits the user data on the TRCH using an MS ID assigned during the connection establishment in step 450. However, without the connection, the NBS proceeds to step 460.

In step 460, the NBS assigns HCCH resources to deliver the user data to the MS. The HCCH resources can be assigned according to the channel status of the MS, the amount of the user data, priority level, etc. In step 470, the NBS transmits HCCH assignment information to the MS on the BCCH. For example, in the OFDM system using the frame structure illustrated in FIG. 11, the HCCH assignment information is an HCCH indication bit and HCCH resource information.

The NBS transmits the user data to the MS on the HCCH using MS_TEMP_ID in step 480. More specifically, the NBS segments the user data to packets of a predetermined packet size, attaches MS_TEMP_ID to each packet, and transmits it on the HCCH.

It is preferred that the NBS uses the HCCH only when the fast downlink service is required according to the type of traffic destined for the MS. In the case of traffic requiring downlink and uplink transmission, such as voice, or traffic not sensitive to delay, such as FTP (File Transfer Protocol), the HCCH is not used. In this case, the NBS does not create MS_TEMP_ID.

Figure 16:
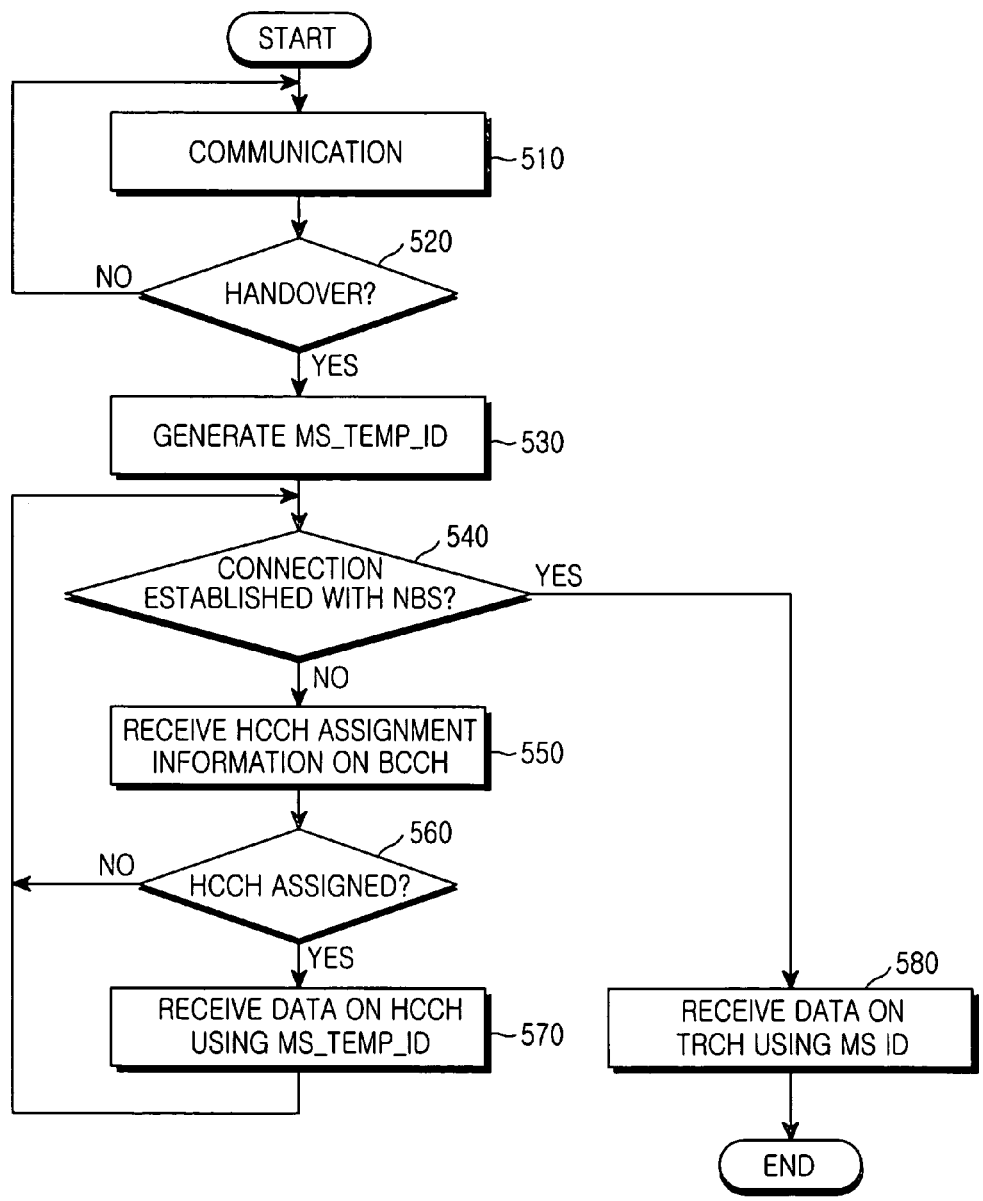
FIG. 16 is a flowchart illustrating an operation in an MS for performing the hard handover according to an embodiment of the present invention.

FIG. 16 is a flowchart illustrating an operation in the MS for performing the hard handover according to the embodiment of the present invention. Referring to FIG. 16, the MS communicates with the OBS in step 510. In step 520, the MS detects a handover or receives a handover indication from the OBS. The MS acquires NBS_ID from the Handover Initiation Message (HIM) or the HD message. In step 530, the MS creates MS_TEMP_ID using OBS_ID and MS_LOCAL_ID.

The MS determines whether a connection for traffic has been established with the NBS in step 540. In a connection, the MS receives user data on the TRCH using an MS ID received from the NBS during the connection establishment in step 580. In the absence of the connection, the MS proceeds to step 550.

The MS receives HCCH assignment information on the BCCH from the NBS in step 550 and determines whether the HCCH is assigned to the MS according to the HCCH assignment information, that is, if there is data destined for the MS on the HCCH in step 560. In the presence of data destined for the MS, the MS receives the user data on the HCCH using MS_TEMP_ID in step 570.

For example, in the OFDM system using the frame structure illustrated in FIG. 11, the MS first receives an OFDM frame and monitors the HCCH indication bit in a predetermined sub-carrier in the first time slot. If the HCCH indication bit is 1, the MS monitors the HCCH resource information in another predetermined sub-carrier in the first time slot. The MS then reads data indicated from the HCCH resource information in the OFDM frame and determines whether an MS ID included in the data is identical to the ID of the MS. If they are identical, the MS processes the data.

Preferably, the MS monitors the BCCH only when it needs the fast downlink service according to the type of traffic for the MS and receives HCCH assignment information. In this case, the MS does not create MS_TEMP_ID.

Major benefits of the present invention described above will be briefly described below.

The present invention provides a method of servicing a hard handover MS on an HCCH during a time delay for which the MS attempts to access an NBS and receives resources from the NBS. The HCCH reduces the time delay by providing the downlink service earlier when the MS, to which traffic must be delivered, moves to the NBS. More particularly, when a bad radio environment or a rapid increase in the number of users leads to a long time delay in access attempts of handover users, the user of the HCCH reduces a service time delay and a packet drop rate, thus maintaining QoS.

Because the present invention is useful for moving pictures and television service requiring fast downlink service, in a preferred embodiment, the NBS determines the type of traffic for an MS and assigns the HCCH to the MS only for moving pictures or television service. The MS also can determine its traffic type and check whether the HCCH has been assigned only for moving pictures or television service.

While the present invention has been shown and described with reference to certain preferred embodiments thereof, they are mere exemplary applications. Accordingly, it will be understood by those skilled in the art that various changes in form and details may be made therein without departing from the spirit and scope of the present invention as defined by the appended claims.

What is claimed is:

1. A method of providing a fast downlink service to a mobile station (MS) in a new base station (NBS) during a hard handover from an old base station (OBS) to the NBS in a cellular communication system, comprising:
receiving handover user information from the OBS;
generating an MS temporary ID (Identification) using the received handover user information to identify the MS; and
transmitting user data to the MS on a common channel using the generated MS temporary ID until a connection is established for traffic transmission between the MS and the NBS.

2. The method of claim 1, wherein the handover user information includes an ID of the OBS and an ID of the MS.

3. The method of claim 2, wherein the step of generating the MS temporary ID comprises the step of connecting the MS ID to the OBS ID.

4. The method of claim 2, wherein the step of generating the MS temporary ID comprises the step of connecting the MS ID to a difference between the OBS ID and an ID of the NBS.

5. The method of claim 1, wherein the step of transmitting the user data comprises the steps of:
assigning resources for the common channel;
transmitting common channel assignment information on a broadcast channel; and
transmitting the user data including the MS temporary ID to the MS on the common channel.

6. The method of claim 5, wherein the common channel assignment information includes a common channel indication bit indicating whether the common channel is used.

7. The method of claim 6, wherein the common channel assignment information also includes common channel resource information.

8. The method of claim 7, wherein the common channel resource information indicates an amount of user data transmittable on the common channel.

9. A method of providing a fast downlink service to a mobile station (MS) in a new base station (NBS) during a hard handover from an old base station (OBS) to the NBS in a cellular communication system, comprising:

receiving handover user information from the OBS;

generating an MS temporary ID (Identification) using the received handover user information to identify the MS;

if user data for the MS is generated before a connection is established for traffic transmission between the MS and the NBS, transmitting the user data to the MS on a common channel using the generated MS temporary ID; and if the user data for the MS is generated after the connection is established for the traffic transmission between the MS and the NBS, transmitting the user data to the MS on a traffic channel.

10. A method of receiving a fast downlink service in a mobile station (MS) during a hard handover from an old base station (OBS) to a new base station (NBS) in a cellular communication system, comprising:

receiving an ID (Identification) of the NBS from the OBS;

generating an MS temporary ID using the received NBS ID and an ID of the MS; and receiving user data on a common channel using the generated MS temporary ID, until a connection is established for traffic transmission between the MS and the NBS.

11. The method of claim 10, wherein the step of generating the MS temporary ID comprises the step of connecting the MS ID to an ID of the OBS ID.

12. The method of claim 10, wherein the step of generating the MS temporary ID comprises the step of connecting the MS ID to the difference between an OBS ID and the NBS ID.

13. The method of claim 10, wherein the step of receiving the user data comprises the steps of:

receiving common channel assignment information on a broadcast channel; and receiving the user data including the MS temporary ID on the common channel from the NBS.

14. The method of claim 13, wherein the common channel assignment information includes a common channel indication bit indicating whether the common channel is used.

15. The method of claim 14, wherein the common channel assignment information also includes common channel resource information.

16. The method of claim 15, wherein the common channel resource information indicates an amount of user data transmittable on the common channel.

17. The method of claim 16, further comprising the step of:

determining sub-carriers assigned to the common channel by the NBS ID and time slots assigned to the common channel by the common channel resource information, if the cellular communication system is an orthogonal frequency division multiplexing (OFDM) system.

18. The method of claim 10, further comprising the step of receiving the user data on a traffic channel when the connection is established for the traffic transmission between the MS and the NBS.

* * * * *